3,387,983
ORGANIC COLOR LAKES
Gustav Edward Rast, Hamburg, N.Y., assignor to Allied Chemical Corporation, New York, N.Y., a corporation of New York
No Drawing. Filed June 11, 1964, Ser. No. 374,248
8 Claims. (Cl. 106—289)

The present invention relates to improved pigments; more particularly, it relates to substantially non-dusting, non-hygroscopic lakes of organic dyestuffs.

Polymeric resins, thermoplastics such as polyethylene, polyvinylidene chloride, polyvinyl acetate, and thermosetting resins, such as melamine-formalydehydes, urea-formaldehydes, are widely employed in the fabrication of shaped articles such as plastic containers, and films such as transparent wrappers for foodstuffs. It is known to color resins with lakes of organic dyestuffs by pigmenting the resin at the elevated temperature, e.g. 100–250° C., used in pressing, extruding, or otherwise molding the resin. Heretofore such use of color lakes has been limited by the high hygroscopicity of available pigment lakes. Thus, lakes of organic dyestuffs absorb water in amounts up to about 20%, based on the weight of the lake, during grinding, e.g. micropulverization, and during storage in the ambient atmosphere. This moisture content of the lake vaporizes during the high temperatures employed for pigmenting and molding polymer resins producing blushing, haziness and, in extreme cases, bubble defects in the resin. The vapor content also impairs the dispersion, brightness and strength of the color. For example, clear polyethylene film when pigmented with conventional concentrations of F.D. & C. (Food, Drug and Cosmetic) color lakes containing as low as about 6% by weight water, often lacks transparency and is colored in relatively weak dull shades. Another disadvantageous property of known pulverulent organic lake pigments is their tendency to form excessive amounts of dust which in severe cases can be a health hazard as well as result in considerable loss of material.

In the past various additives have been incorporated in organic color lakes as protective agents, surfactants and dispersants, oily vehicles and the like. Anionic surfactants such as alkali metal ligno-sulfonates and non-ionic surfactants such as lecithin are relatively ineffective in suppressing absorption of moisture. Furthermore, additives proposed heretofore as antidusting agents for color lakes are relatively ineffective for inhibiting the absorption of moisture by such lakes and some additives may actually promote moisture absorption.

It is the principal object of the present invention to devise novel organic color lake compositions which are substantially non-dusting and non-hygroscopic.

It is a further object of this invention to provide improved color lakes eminently suitable for pigmenting polymeric resins, plastic wrapping for foodstuffs, edible oils and sugar preparations, such as coatings for candies and pills, with high brilliance, tinctorial strength, and good color dispersion.

These and other objects and advantages will be apparent from the following description of my invention.

I have discovered that novel substantially non-dusting, non-hygroscopic compositions are obtained by incorporating a small but effective amount of a lipophilic, long chain monocarboxylic fatty acid partial ester of a hexitol anhydride into a lake of a water soluble organic dyestuff, to suppress absorption of moisture.

The novel color lake compositions of the present invention in general were found to absorb no more than about 1–2% by weight of water based on the weight of the lake during grinding, e.g. when micropulverized in the ambient atmosphere. On exposure to the atmosphere for 24 hours or longer the improved lakes generally absorb no more than about 4% by weight of water. Furthermore, the improved organic lake pigments generate only minute quantities of dust when poured.

The color lakes employed in the novel compositions of the invention are absorbed on, or chemically combined with an inorganic compound. Suitable lakes include, for example, aluminum, calcium, barium, strontium and iron lakes of organic dyes containing sulfo acid and/or carboxy groups; as well as phosphotungstic, phosphomolybdic, phosphotungstomolybdic, silico-tungstic or silico-tungstomolybdic lakes of basic dyes of the following typically exemplary illustrations:

aminopolyarylmethane derivatives such as methyl and crystal violets
thiazines such as methylene blue
acridines
phosphines
xanthenes such as rhodamines
azodyes such as chrysoidine
indamines
thiazoles
oxazines For most uses an aluminum lake, in accordance with 21 C.F.R. (Code of Federal Regulations) 9.100 is used. These are lakes of water soluble, edible, certified, organic F.D. & C. (Food, Drug & Cosmetic) colors rendered insoluble by being formed into a lake. A lake usually contains 15 to 50% color, based on the weight of the lake. Typical F.D. & C. colors are described in 21 C.F.R., sections 9.21, 9.40 ,9.41, 9.61, 9.62, 9.63, 9.80, 9.81, and 9.90.

The hexitol anhydride partial esters employed in color lake compositions in accordance with the invention, are water insoluble lipophilic nonionic surface active esters derived from long chain monocarboxylic fatty acids, i. e. acids containing 12 to 22 carbon atoms. Typical examples of suitable hexitol anhydride monocarboxylic fatty acid partial esters are Liquid esters: sorbitan monolaurate; sorbitan monooleate; sorbitan trioleate; mannitan oleate; mixed esters of sorbitan or mannitan with coconut oil fatty acid and the like; and Solid esters: sorbitan monopalmitate; sorbitan monostearate; and sorbitan tristearate.

Preferably a liquid ester which is more readily mixed with the color lake is used. A liquid ester of high viscosity, such as about 3500–5000 centipoises at ambient temperature, for instance, sorbitan monolaurate, provides especially good results.

The color lake compositions of the invention can be prepared from color lakes which have been dried in a conventional manner, for instance, by heating in a hot air or vacuum oven at about 50–70° C., and which contain about 8 to 20% by weight moisture. I prefer however to use substantially anhydrous color lakes, i.e. lakes containing less than about 3.5% by weight water, which can be obtained by the known method of azeotropic dehydration. According to this known process a water-wet color lake is suspended in benzene, toluene, p-xylene or other comparable low boiling hydrocarbon liquid which can form an azeotrope with water. The mixture is distilled and the organic layer of the distillate is separated and returned to the still. The distillation is continued until substantially anhydrous hydrocarbon distills. The dehydrated organic color lake is recovered, by filtration of the distilland, and advantageously heated under vacuum at about 65–75° C. to expel traces of the hydrocarbon.

The hexitol anhydride ester and the color lake can be mixed at any suitable time in the preparation of the dry lake, for instance the dehydrated lake can be tumbled with a liquid ester. Preferably the ester is added to the slurry of lake and water azeotroping hydrocarbon. This permits uniform incorporation of solid and liquid ester with the lake and such operation precludes water absorption during handling of the dehydrated lake as may be the case when the ester is mixed with the dry lake powder in a moist atmosphere. Since a portion of ester is lost when the lake is filtered off the water-entraining hydrocarbon, it is necessary to employ a sufficient concentration of ester initially to provide the desired concentration of ester in the final product.

The dry color lake containing the hexitol anhydride ester can be ground in conventional manner in a micropulverization mill to a fine powder.

Preferably about 0.02 to 0.2% by weight of hexitol anhydride ester, based on the weight of the color lake, is used; this preferred amount is generally compatible with health requirements for additives to F.D. & C. colors. Use of amounts of hexitol anhydride ester in excess of about 2% by weight of the lake, while effective in suppressing absorption of water and dusting, is unnecessary and may be undesirable for some applications, notably in coloration of thermoplastics at extreme temperatures (ca. 250° C.). When the present organic color lakes are to be applied from an aqueous medium, a hydrophilic non-ionic surfactant such as a polyoxyethylene ether of sorbitan monolaurate is desirably added to promote dispersion of the lake in water. The amount of hydrophilic dispersant used is generally about 40 to 100% of the weight of lipophilic ester incorporated in the color lake.

The following examples set forth the best methods contemplated for carrying out the invention; but the invention is not limited to all details of the examples. Parts and percentages are by weight, and temperatures in ° C. In the examples the water content of the lake is determined in accordance with the Karl Fischer analysis, described in A.S.T.M. Method No. D 1638–61T.

EXAMPLE 1

Part A 1450 parts water-wet aluminum color lake with a solids content of 15.5%, containing about 42% F.D. & C. Red 4, based on the weight of the dry lake, is slurried in a mixture of 100 parts of water, 1 part polyoxyethylene sorbitan monolaurate, a non-lipophilic ester; and 1 part sorbitan monolaurate, a lipophilic ester. After the addition of 1732 parts of toluene, the mass is heated to boiling and dehydrated by distilling the toluene-water azeotrope from the mixture, the toluene layer of the distillate being continuously separated and returned to the still. The distillation is continued until substantially anhydrous toluene distills from the mixture. The distilland is cooled to ambient temperature and filtered and the filter cake is dried under vacuum at 70–75° for 72 hours to remove traces of toluene. The product (225 parts containing about 0.1 part sorbitan monolaurate and 0.1 part polyoxyethylene sorbitan monolaurate) when micropulverized in a stainless steel mill yields a finely divided substantially non-dusting powder which contains 3.4% water as determined by the Karl Fischer analysis. This pigment is incorporated into polyethylene which is then drawn into a film having high transparency and color strength. The pigment after exposure to ambient air for 24 hours absorbs only about 4% water.

Part B

The procedure of Part A is repeated substantially as described except that incorporation of sorbitan monolaurate in the pigment is omitted. Before micropulverization the resulting pigment contains 3.3% water as determined by the Karl Fischer analysis. After micropulverization the pigment contains 7.4% water and generates on agitation a considerable cloud of dust which settles slowly.

The above procedure is repeated employing 2070 parts of p-xylene instead of toluene in the dehydration step. The resulting lake is ground in a ball-mill for 4 hours. This pigment, when exposed to ambient air for 24 hours absorbs 15.5% water, based on the weight of the pigment.

EXAMPLE 2

A 245 part sample of aluminum color lake containing about 40% of F.D. & C. Red 3, which was previously dried for 72 hours in a circulating air drier at 65°, is dehydrated by a procedure analogous to that described in Example 1, Part A, employing about 815 parts of technical heptane as the water-entraining liquid. The color lake is recovered by filtration from the distilland and heated under vacuum at 75° C. for 48 hours. The resulting product (239.5 parts) after being mixed well with about 0.15 part polyoxyethylene sorbitan monolaurate and about 0.15 part sorbitan monolaurate, contains 1.7% water. The product is micropulverized to a fine powder, having a water content of 2.4%, which generates only a slight, rapidly settling dust cloud on agitation.

EXAMPLE 3

A mixture of 810 parts of a water-wet aluminum lake with a solids content of 26.5%, containing about 45%, based on the weight of the dry lake, F.D. & C. Red 2, 0.5 part sorbitan monolaurate, 0.5 part polyoxyethylene sorbitan monolaurate, and 1732 parts of toluene, is dehydrated by azeotropic distillation substantially as described in Example 1, Part A. The color lake is recovered by filtration of the distilland and heated at 70–75° under vacuum for 16 hours to expel adhering toluene. The product, consisting of 215.5 parts, which contain 2.86% water and about 0.05 part sorbitan monolaurate, is micropulverized to a finely divided substantially non-dusting, non-hygroscopic powder which contains 4.67% water. This pigment is incorporated into polyethylene film and provides red coloration of high transparency and color strength.

EXAMPLE 4

A mixture of 784 parts of a water-wet aluminum lake, having a solids content of 26.3%, and containing about 30% F.D. & C. Violet 1, based on the weight of the dry lake, and 0.5 part sorbitan monolaurate is dehydrated by azeotropic distillation with toluene as described in Example 1, Part A. The color lake is recovered by filtration of the distilland and heated at 70–75° under vacuum for 72 hours.

The resulting product of 207 parts containing 2.6% water and about 0.05 part sorbitan monolaurate, is micropulverized to a finely divided substantially non-dusting non-hygroscopic powder without measurable increase in water content. The pigment so obtained provides violet colorations of polyethylene film of high transparency and color strength.

EXAMPLE 5

A water-wet aluminum lake containing 33.6% F.D. & C. Yellow 6, is dried for 72 hours in a circulating hot air oven at 65° and ground to a powder in a Waring Blendor. A 212 part sample with a water content of about 8% is slurried in 879 parts of benzene and dehydrated by azeotropic distillation according to the method of Example 1, Part A. The thus obtained dehydrated color lake of 197.5 parts, containing less than 1% by weight of moisture, is mixed with about 0.07 part sorbitan monolaurate and about 0.07 part polyoxyethylene sorbitan monolaurate. The resulting product is micropulverized in ambient air to a substantially non-dusting, non-hygroscopic pigment powder without measurable increase in moisture content. The pigment provides attractive yellow colorations of polyethylene film of high transparency and color strength.

EXAMPLE 6

50 parts of polyethylene is heated in an oven at 90° for one hour. The polyethylene is charged to a mill having two rolls rotating at different rates, in which the front roll is maintained at 98.9° by steam at 10 p.s.i.g., and the back roll is maintained at ambient temperature. The charge is milled until the resin adheres completely to the rolls. 0.119 part of the color lake composition of Example 1, Part A, is added to the polyethylene and the mixture is milled for 7 minutes. During the milling the extruded edges of the polyethylene are intermittently cut with a milling knife and worked back and forth across the rolls. The colored polyethylene sheet is removed from the mill and allowed to cool to ambient temperature. In like manner a 50 part sample of polyethylene is colored with a conventional aluminum lake of F.D. & C. Red 4 which is devoid of sorbitan monolaurate and contains 12-20% moisture. The two polyethylene sheets thus obtained are placed adjacent to each other between polished plates and pressed into a single transparent specimen using a Carver hydraulic press operating at 104° and 2000 p.s.i.g. The two colored sections are compared visually by observation of transmitted light. The section colored with the pigment composition of Example 1 is found to be superior in color strength, transparency, dispersion of color and possesses a yellower more pleasing shade than the section colored with the conventional F.D. & C. Red 4 lake.

I claim:
1. A substantially anhydrous color lake composition consisting essentially of
   a water-insoluble aluminum lake of a water-soluble, edible, non-toxic dyestuff, and
   a water-insoluble, lipophilic, nonionic, surface-active, hexitol anhydride partial ester of a long chain monocarboxylic fatty acid having 12-22 carbon atoms in a small but sufficient amount to inhibit absorption of water and dusting of said lake when in the dry, pulverulent form, said amount not exceeding 2% of the weight of the aluminum lake,
whereby said composition can be incorporated into a polymeric resin and subjected to forming temperatures of 100°-250° C. without causing haziness of the colored resin.

2. The color lake composition of claim 1, wherein said hexitol anhydride partial ester is selected from the group consisting of mono-, di- and tri-esters of monocarboxylic fatty acids having 12 to 22 carbon atoms, and the amount of said ester is 0.02 to 0.2% of the weight of the lake.

3. The color lake composition of claim 2, wherein said ester is selected from the group consisting of sorbitan and mannitan monoesters of said monocarboxylic fatty acids.

4. The color lake composition of claim 2, wherein said organic dyestuff is an F.D. & C. color and said ester is sorbitan monolaurate.

5. The color lake composition of claim 3, wherein said ester is a liquid ester having a viscosity of at least 3,500 centipoises at ambient temperature.

6. A color lake composition as claimed in claim 5 which consists essentially of said aluminum lake, said liquid ester in said amounts, and a hydrophilic, anionic polyoxyethylene ether surfactant in an amount which is 40% to 100% of the weight of said ester.

7. A process for producing a color lake composition as defined in claim 1, which comprises heating a mixture of
   a water-wet, insoluble aluminum lake of a water-soluble, edible, non-toxic dyestuff,
   a water-insoluble, lipophilic, nonionic, surface-active hexitol anhydride partial ester of a long chain monocarboxylic fatty acid having 12-22 carbon atoms in a small but sufficient amount to inhibit absorption of water and dusting of said lake when in the dry, pulverulent form, and
   a low boiling hydrocarbon which forms an azeotrope, with water,
distilling water from the resulting mixture of azeotropic distillation until substantially anhydrous hydrocarbon distills, and recovering the resulting dehydrated color lake containing the hexitol anhydride partial ester.

8. The process of claim 7 wherein the lake is an aluminum lake of an F.D. & C. color, the partial ester is sorbitan monolaurate and the amount of said ester is 0.02 to 0.2% of the weight of the lake.

References Cited
UNITED STATES PATENTS

| | | | |
|---|---|---|---|
| 2,982,666 | 5/1961 | Chun et al. | 106—308 |
| 2,079,548 | 5/1937 | Crossley et al. | 106—308 |

FOREIGN PATENTS

| | | |
|---|---|---|
| 590,894 | 1/1960 | Canada. |
| 918,516 | 2/1963 | Great Britain. |

OTHER REFERENCES

The Condensed Chemical Dictionary, 6th Ed., 1961, p. 1063.

TOBIAS E. LEVOW, Primary Examiner.

HELEN M. McCARTHY, JAMES E. POER, Examiners.